US012440452B2

(12) United States Patent
Uchida et al.

(10) Patent No.: US 12,440,452 B2
(45) Date of Patent: Oct. 14, 2025

(54) ROPINIROLE-CONTAINING PATCH AND METHOD FOR IMPROVING SKIN PERMEABILITY OF ROPINIROLE

(71) Applicant: HISAMITSU PHARMACEUTICAL CO., INC., Tosu (JP)

(72) Inventors: Naoyuki Uchida, Tsukuba (JP); Satoshi Amano, Tsukuba (JP)

(73) Assignee: HISAMITSU PHARMACEUTICAL CO., INC., Tosu (JP)

( * ) Notice: Subject to any disclaimer, the term of this patent is extended or adjusted under 35 U.S.C. 154(b) by 366 days.

(21) Appl. No.: 18/034,480

(22) PCT Filed: Oct. 21, 2021

(86) PCT No.: PCT/JP2021/038892
§ 371 (c)(1),
(2) Date: Apr. 28, 2023

(87) PCT Pub. No.: WO2022/091925
PCT Pub. Date: May 5, 2022

(65) Prior Publication Data
US 2024/0016758 A1 Jan. 18, 2024

(30) Foreign Application Priority Data
Oct. 29, 2020 (JP) ................................. 2020-181280

(51) Int. Cl.
*A61K 9/70* (2006.01)
*A61K 31/4045* (2006.01)
*A61K 47/12* (2006.01)

(52) U.S. Cl.
CPC ........ *A61K 9/7084* (2013.01); *A61K 31/4045* (2013.01); *A61K 47/12* (2013.01)

(58) Field of Classification Search
CPC ................ A61K 9/7038; A61K 9/7084; A61K 31/4045; A61K 47/12; A61P 25/00; A61P 25/16
See application file for complete search history.

(56) References Cited

U.S. PATENT DOCUMENTS 5,872,111 A * 2/1999 Au .................... A61K 31/70
536/18.7
2004/0253299 A1 12/2004 Beier et al.
2011/0028880 A1 2/2011 Uchida et al.
2012/0052113 A1 3/2012 Uchida et al.
2014/0112974 A1 4/2014 Takagi et al.
2014/0170205 A1 6/2014 Uchida et al.
2014/0343115 A1 11/2014 Inoo et al.
2019/0177308 A9 * 6/2019 Patron .................. C07D 409/12
2020/0121611 A1 4/2020 Ohashi et al.
2020/0297654 A1 * 9/2020 Marchant ............. A61K 9/7069

FOREIGN PATENT DOCUMENTS

| JP | 2012-140407 A | 7/2012 |
|---|---|---|
| JP | 2015-526480 A | 9/2015 |
| JP | 2015-221767 A | 12/2015 |
| JP | 2016-535781 A | 11/2016 |
| JP | 2017-178967 A | 10/2017 |
| WO | 2009/107478 A1 | 9/2009 |
| WO | 2009/107479 A1 | 9/2009 |
| WO | 2010/134433 A1 | 11/2010 |
| WO | 2012/165253 A1 | 12/2012 |
| WO | 2012/165254 A1 | 12/2012 |
| WO | 2018/155390 A1 | 8/2018 |

OTHER PUBLICATIONS

Koteshwarrao et al., "Approaches of Enhance Transdermal Delivery of Ropinirole HCL", World Journal of Pharmaceutical Research, vol. 7, Issue 6, 2018, 657-671.
Matsumoto et al., "Duration of Absorption-Enhancing Effect of Sodium Octanoate Sodium Hexanoate or Glyceryl-1-monooctanoate on Rectal Absorption of Gentamicin in Rabbits", J. Pharmacobio-Dyn., vol. 13, 1990, pp. 591-596.
Extended European Search Report dated Aug. 29, 2024 in application No. 21886044.3.
International Search Report for PCT/JP2021/038892 dated Nov. 30, 2021.
International Preliminary Report on Patentability dated May 2, 2023 with a Translation of the Written Opinion of the International Searching Authority in Application No. PCT/JP2021/038892.

* cited by examiner

*Primary Examiner* — Adam Marcetich
*Assistant Examiner* — Timothy L Flynn
(74) *Attorney, Agent, or Firm* — Sughrue Mion, PLLC

(57) ABSTRACT

A ropinirole-containing patch comprising a backing layer and an adhesive agent layer, wherein
the adhesive agent layer comprising:
at least one selected from the group consisting of ropinirole and a pharmaceutically acceptable salt thereof;
at least one sodium carboxylate selected from the group consisting of sodium pentanoate, disodium glutarate, and sodium hexanoate; and
an adhesive agent.

6 Claims, No Drawings

ROPINIROLE-CONTAINING PATCH AND METHOD FOR IMPROVING SKIN PERMEABILITY OF ROPINIROLE

CROSS REFERENCE TO RELATED APPLICATIONS

This application is a National Stage of International Application No. PCT/JP2021/038892 filed Oct. 21, 2021, claiming priority based on Japanese Patent Application No. 2020-181280 filed Oct. 29, 2020.

TECHNICAL FIELD

The present invention relates to a patch and a method for improving skin permeability of a drug, and more specifically to a patch comprising ropinirole and/or a pharmaceutically acceptable salt thereof and a method for improving skin permeability of ropinirole and/or a pharmaceutically acceptable salt thereof.

BACKGROUND ART

Ropinirole is known as a drug useful for treating Parkinson's disease, restless legs syndrome, and the like, and transdermal administration of a preparation containing ropinirole and/or a pharmaceutically acceptable salt thereof has been studied in recent years from the viewpoint of reduction in frequency of administration, improvement in the compliance, and easiness of administration and discontinuation thereof.

For example, International Publication No. WO2010/134433 (PTL 1) states a preparation for transdermal absorption comprising a backing and an adhesive agent layer containing ropinirole or a pharmaceutically acceptable acid addition salt thereof, and International Publication No. WO2012/165253 (PTL 2) and International Publication No. WO2012/165254 (PTL 3) each state a ropinirole-containing patch comprising a backing layer and an adhesive agent layer containing ropinirole and/or a pharmaceutically acceptable salt thereof.

In addition, International Publication No. WO2009/107478 (PTL 4) states a patch comprising a backing and an adhesive agent layer, wherein the adhesive agent layer contains ropinirole and a metal salt generated by reaction of an acid addition salt of ropinirole and a desalting agent, for the purpose of suppressing the production of ropinirole analogues, and International Publication No. WO2009/107479 (PTL 5) states that the content of the metal salt is set within a specific range for the purpose of suppressing cohesion and growth of the metal salt over time.

Further, for example, International Publication No. WO2018/155390 (PTL 6) states that in a patch comprising a backing layer and an adhesive agent layer, the adhesive agent layer contains a mixture of an acid addition salt of ropinirole and potassium bicarbonate, for the purpose of suppressing crystal precipitation in the adhesive agent layer and excellent ropinirole skin permeability.

In transdermal administration of a preparation containing ropinirole and/or a pharmaceutically acceptable salt thereof, excellent skin permeability is required. PTLs 1 to 6 state that absorption enhancers for enhancing transdermal absorption of ropinirole and/or a pharmaceutically acceptable salt thereof may be used. In addition, it is also known to cause free ropinirole (free form) to be transdermally absorbed by desalting an acid addition salt of ropinirole with a desalting agent during production of the preparation or in the produced preparation, and PTLs 1 to 5 state, for example, a strong base such as sodium hydroxide as the desalting agent.

However, besides the configuration using the above absorption enhancers and the configuration using a desalting agent such as sodium hydroxide, a method for improving skin permeability of ropinirole and/or a pharmaceutically acceptable salt thereof has not been sufficiently studied yet.

CITATION LIST

Patent Literature

[PTL 1] International Publication No. WO2010/134433
[PTL 2] International Publication No. WO2012/165253
[PTL 3] International Publication No. WO2012/165254
[PTL 4] International Publication No. WO2009/107478
[PTL 5] International Publication No. WO2009/107479
[PTL 6] International Publication No. WO2018/155390

SUMMARY OF INVENTION

Technical Problem

The present invention has been made in view of the above problems of the conventional techniques, and an object thereof is to provide a ropinirole-containing patch that is excellent in skin permeability of ropinirole and/or a pharmaceutically acceptable salt thereof and a method for improving skin permeability of ropinirole and/or a pharmaceutically acceptable salt thereof, from a viewpoint different from the configurations of the conventional ropinirole-containing patches.

Solution to Problem

The present inventors continuously conducted earnest studies in order to achieve the above object, and consequently have found that in a patch comprising a backing layer and an adhesive agent layer, wherein the adhesive agent layer comprising: at least one selected from the group consisting of ropinirole and a pharmaceutically acceptable salt thereof; and an adhesive agent, it is possible to obtain a patch excellent in skin permeability of ropinirole and/or a pharmaceutically acceptable salt thereof by causing the adhesive agent layer to further comprise a specific sodium carboxylate selected from the group consisting of sodium pentanoate, disodium glutarate, and sodium hexanoate, and have led to the completion of the present invention.

Specifically, a ropinirole-containing patch of the present invention is a patch comprising a backing layer and an adhesive agent layer, wherein
  the adhesive agent layer comprising:
  at least one selected from the group consisting of ropinirole and a pharmaceutically acceptable salt thereof;
  at least one sodium carboxylate selected from the group consisting of sodium pentanoate, disodium glutarate, and sodium hexanoate; and an adhesive agent.

In the ropinirole-containing patch of the present invention, a content of the sodium carboxylate is preferably 0.1 to 45% by mass relative to a total mass of the adhesive agent layer. Further, in the adhesive agent layer, it is also preferably 0.1 to 5.0 mol relative to 1.0 mol of at least one selected from the group consisting of ropinirole and a pharmaceutically acceptable salt thereof in content in terms of free ropinirole.

Furthermore, in the ropinirole-containing patch of the present invention, a content of at least one selected from the group consisting of ropinirole and a pharmaceutically acceptable salt thereof, in terms of free ropinirole, is preferably 5 to 30% by mass relative to the total mass of the adhesive agent layer.

Further, in the ropinirole-containing patch of the present invention, the adhesive agent is preferably at least one selected from the group consisting of a rubber-based adhesive agent, an acrylic-based adhesive agent having no carboxy group, and a silicone-based adhesive agent.

A method for improving skin permeability of ropinirole of the present invention is a method for improving skin permeability of at least one selected from the group consisting of ropinirole and a pharmaceutically acceptable salt thereof in a ropinirole-containing patch comprising a backing layer and an adhesive agent layer, wherein
the adhesive agent layer comprising:
at least one selected from the group consisting of ropinirole and a pharmaceutically acceptable salt thereof and an adhesive agent,
the method comprising:
a step of causing the adhesive agent layer to further comprise at least one sodium carboxylate selected from the group consisting of sodium pentanoate, disodium glutarate, and sodium hexanoate.

Advantageous Effects of Invention

The present invention makes it possible to provide a ropinirole-containing patch that is excellent in skin permeability of ropinirole and/or a pharmaceutically acceptable salt thereof and a method for improving skin permeability of ropinirole and/or a pharmaceutically acceptable salt thereof.

DESCRIPTION OF EMBODIMENTS

Hereinafter, the present invention will be described in detail based on preferred embodiments thereof.

A ropinirole-containing patch of the present invention (hereinafter sometimes simply referred to as a "patch of the present invention") comprises a backing layer and an adhesive agent layer, wherein the adhesive agent layer comprising: at least one selected from the group consisting of ropinirole and a pharmaceutically acceptable salt thereof; at least one sodium carboxylate selected from the group consisting of sodium pentanoate, disodium glutarate, and sodium hexanoate; and an adhesive agent.

The patch of the present invention comprises the backing layer and the adhesive agent layer, and preferably, the adhesive agent layer is arranged on one surface of the backing layer.

The backing layer according to the present invention is not particularly limited as long as the backing layer can support the adhesive agent layer described later, and a publicly-known backing layer for patches may be employed as appropriate. The material of the backing layer according to the present invention includes, for example, polyolefins such as polyethylene and polypropylene; ethylene-vinyl acetate copolymer, vinyl acetate-vinyl chloride copolymer, polyvinyl chloride, and the like; polyamides such as nylon; polyesters such as polyethylene terephthalate (PET), polybutylene terephthalate, and polyethylene naphthalate; cellulose derivatives; synthetic resins such as polyurethane, and metals such as aluminum. Among these, polyester is preferable from the viewpoint of non-drug adsorbing property and non-drug permeability. The form of the backing layer includes, for example, films; sheets such as a sheet, a sheet-shaped porous body, and a sheet-shaped foam; fabrics such as a woven fabric, a braided fabric, and a nonwoven fabric; foils; and laminates obtained by combining one or more of these. In addition, the thickness of the backing layer is not particularly limited, but is preferably within a range of 5 to 1000 μm from the viewpoint of easiness of work in applying the patch and easiness of production.

The patch of the present invention may further comprise a release liner on a surface of the adhesive agent layer opposite to the backing layer. Such a release liner includes a film and a sheet made of a material such as polyolefins such as polyethylene and polypropylene; ethylene-vinyl acetate copolymer, vinyl acetate-vinyl chloride copolymer, polyvinyl chloride, and the like; polyamides such as nylon; polyesters such as polyethylene terephthalate; cellulose derivatives; synthetic resins such as polyurethane, aluminum, and paper, and a laminate of these. The above release liners are preferably those processed by a release treatment using a silicone-containing compound coating, fluorine-containing compound coating, or the like on a surface thereof which comes into contact with the adhesive agent layer so that the release liner can be easily peeled off the adhesive agent layer.

The adhesive agent layer according to the present invention comprises at least one selected from the group consisting of ropinirole and a pharmaceutically acceptable salt thereof (in the Specification, sometimes referred to as "ropinirole and/or a pharmaceutically acceptable salt thereof") as the drug.

Ropinirole comprised in the adhesive agent layer according to the present invention may be a free form (in the Specification, sometimes referred to as "free ropinirole") or may be a pharmaceutically acceptable salt thereof, or a free ropinirole obtained by desalting a pharmaceutically acceptable salt of ropinirole in a preparation during the production and/or after the production, and one of these may be used or a mixture of two or more of these may be used.

As the pharmaceutically acceptable salt of ropinirole, a pharmaceutically acceptable acid addition salt of ropinirole (in the Specification, sometimes referred to as a "ropinirole acid addition salt") is preferable. The acid of the ropinirole acid addition salt includes, for example, hydrochloric acid, sulfuric acid, nitric acid, phosphoric acid, phosphorous acid, hydrobromic acid, maleic acid, malic acid, ascorbic acid, tartaric acid, and fumaric acid, and one or a mixture of two or more of these acid addition salts may be used.

When the adhesive agent layer is caused to comprise the ropinirole acid addition salt as an ingredient of the patch of the present invention, since a sodium carboxylate described below is also a weak base, when the ropinirole acid addition salt is mixed with the fatty acid metal salt, all or part of the ropinirole acid addition salt is desalted (neutralized) in the adhesive agent layer of the preparation during the production and/or after the production, so that free ropinirole in the state of a free base is obtained, and consequently, it becomes possible to cause free ropinirole having a higher transdermal absorption to exist in the adhesive agent layer when the preparation is applied.

The content of the ropinirole and/or a pharmaceutically acceptable salt thereof according to the present invention (the content of free ropinirole or the content of a pharmaceutically acceptable salt of ropinirole, or in a case where both of free ropinirole and a pharmaceutically acceptable salt of ropinirole are comprised, the total content of these, the same applies hereinafter.) is preferably 5 to 30% by mass, more preferably 5 to 25% by mass, and further preferably 5 to 20% by mass, and even more preferably 5 to 13.2% by mass relative to the total mass of the adhesive agent layer in terms of free ropinirole. If the content of the ropinirole and/or a pharmaceutically acceptable salt thereof is less than the lower limit, the skin permeability of the ropinirole and/or a pharmaceutically acceptable salt thereof (in the Specification, sometimes referred to as "skin permeability of ropinirole") tends to decrease. On the other hand, if the content is more than the upper limit, since the absolute amount in the adhesive agent layer is increased, this tends to make it difficult to spread the composition in the adhesive agent layer when the adhesive agent layer is formed, and make it difficult to obtain a uniform preparation.

The adhesive agent layer according to the present invention comprises at least one sodium carboxylate selected from the group consisting of sodium pentanoate, disodium glutarate, and sodium hexanoate (in the Specification, unless otherwise specified, "sodium carboxylate" is used synonymously). These sodium carboxylates according to the invention are sodium salts of pentanoic acid, glutaric acid, and hexanoic acid, respectively. By using these sodium carboxylates, excellent ropinirole skin permeability is achieved even though they are weak bases. Such an effect is different from the effect expected from the mere desalting action of the sodium carboxylates, even when the ropinirole acid addition salt is used.

The content of the sodium carboxylate according to the present invention (which is, in the case where there are two or more, the total content of these, the same applies hereinafter.) is preferably 0.1 to 45% by mass, more preferably 1 to 30% by mass, further preferably 5 to 20% by mass, and even more preferably 6 to 10% by mass, relative to the total mass of the adhesive agent layer. If the content of the sodium carboxylate is less than the lower limit, the skin permeability of ropinirole tends to decrease. On the other hand, if the content is more than the upper limit, the cohesive force of the adhesive agent layer tends to decrease. Note that in a case where a component derived from the sodium carboxylate described below is comprised, the content of the sodium carboxylate according to the present invention also comprises the content of the component in terms of sodium carboxylate in addition to the content of the sodium carboxylate.

In addition, in the adhesive agent layer according to the present invention, the content of the sodium carboxylate is, in terms of the number of carboxy group residues (COO), preferably 0.1 to 5.0 mol, more preferably 0.2 to 4.0 mol, further preferably 0.5 to 3.0 mol, even more preferably 0.6 to 3.0 mol, and particularly preferably 0.8 to 1.5 mol, relative to 1.0 mol of the ropinirole and/or a pharmaceutically acceptable salt thereof in content in terms of free ropinirole. If the content of the sodium carboxylate is less than the lower limit, the skin permeability of ropinirole tends to decrease. On the other hand, if the content is more than the upper limit, the cohesive force of the adhesive agent layer tends to decrease.

In a case where the adhesive agent layer is caused to comprise the ropinirole acid addition salt as an ingredient of the patch of the present invention, all or part of the ropinirole acid addition salt is desalted in the adhesive agent layer of the preparation during the production and/or after the production by the sodium carboxylate, which is also a weak base. Hence, in this case, the adhesive agent layer according to the present invention only has to comprise at least a mixture of the ropinirole acid addition salt and the sodium carboxylate besides the adhesive agent described below, and may comprise, as the mixture, a component derived from free ropinirole and the sodium carboxylate as a desalting reaction product of the ropinirole acid addition salt and the sodium carboxylate (component derived from the sodium carboxylate).

The component derived from the sodium carboxylate includes carboxylic acids, carboxylic acid ions, sodium salts, and sodium ions, and one of these may be used or two or more of these may be used in combination. Although it depends on the acid of the ropinirole acid addition salt or the type of an acid which may be comprised in the adhesive agent layer as necessary, the sodium salt includes, for example, sodium salts with hydrochloric acid, sulfuric acid, nitric acid, phosphoric acid, phosphorous acid, hydrobromic acid, maleic acid, malic acid, ascorbic acid, tartaric acid, and fumaric acid.

The adhesive agent layer according to the present invention comprises an adhesive agent. The adhesive agent according to the present invention includes a rubber-based adhesive agent, an acrylic-based adhesive agent, a silicone-based adhesive agent, and the like, and one of these may be used or two or more of these may be used in combination. Among these, the adhesive agent according to the present invention is preferably at least one selected from the group consisting of a rubber-based adhesive agent, an acrylic-based adhesive agent having no carboxy group, and a silicone-based adhesive agent and more preferably at least one selected from the group consisting of a rubber-based adhesive agent and an acrylic-based adhesive agent having no carboxy group, and further preferably comprises at least a rubber-based adhesive agent.

The content of the adhesive agent in the adhesive agent layer according to the present invention (which is, in the case where there are two or more, the total content of these, the same applies hereinafter.) is preferably 10 to 90% by mass, and more preferably 20 to 70% by mass, relative to the total mass of the adhesive agent layer.

The rubber-based adhesive agent according to the present invention includes natural rubber and synthetic rubbers, and more preferably is at least one selected from the group consisting of synthetic rubbers having no hydroxyl group or carboxy group such as styrene-isoprene-styrene block copolymer (SIS), isoprene rubber, polyisobutylene (PIB), styrene-butadiene-styrene block copolymer (SBS), styrene-butadiene rubber (SBR), and polybutene from the viewpoint that these tend to be excellent in the cohesive force of the adhesive agent layer and the skin permeability of ropinirole. In the present invention, the "synthetic rubbers having no hydroxyl group or carboxy group" represent synthetic rubbers having substantially no hydroxyl group or carboxy group, and preferably those in each of which the content of the hydroxyl group and the carboxy group in the molecule is less than 3% by mass.

In the case where the adhesive agent layer according to the present invention comprises the rubber-based adhesive agent, the content thereof (which is, in the case where there are two or more, the total content of these, the same applies hereinafter.) is preferably 10 to 80% by mass, more preferably 10 to 70% by mass, further preferably 10 to 55% by mass, and even more preferably 15 to 35% by mass relative to the total mass of the adhesive agent layer. If the content of the rubber-based adhesive agent is less than the lower limit, the cohesive force of the adhesive agent layer tends to decrease. On the other hand, if the content is more than the upper limit, the adhesive agent layer becomes so hard that the adhesiveness of the patch tends to decrease.

The acrylic-based adhesive agent according to the present invention includes those listed as adhesive agents in "Japanese Pharmaceutical Excipients Directory 2016 (edited by International Pharmaceutical Excipients Council Japan)". One of these may be used or two or more of these may be used in combination, but the acrylic-based adhesive agent is preferably an acrylic-based adhesive agent having no carboxy group, and more preferably an acrylic-based adhesive agent having no functional group. In the present invention, the "acrylic-based adhesive agent having no carboxy group" and the "acrylic-based adhesive agent having no functional group" represent acrylic-based polymers having substantially no carboxy group or functional group, and preferably those in each of which the content of the carboxy group and the functional group in the polymer is less than 3% by mass.

The acrylic-based adhesive agent having no carboxy group includes, for example, acrylic-based adhesive agents that have substantially no functional group such as 2-ethylhexyl acrylate·vinylpyrrolidone copolymer, 2-ethylhexyl acrylate·2-ethylhexyl methacrylate·dodecyl methacrylate copolymer, 2-ethylhexyl acrylate·vinyl acetate copolymer, 2-ethylhexyl acrylate·methyl methacrylate·butyl acrylate copolymer, 2-ethylhexyl acrylate·methacrylic acid copolymer, and ethyl acrylate·methyl methacrylate copolymer; and acrylic-based adhesive agents that have a hydroxy group such as 2-ethylhexyl methacrylate·vinyl acetate·2-hydroxyethyl acrylate copolymer, 2-hydroxyethyl methacrylate copolymer, 2-hydroxypropyl methacrylate copolymer, 3-hydroxypropyl methacrylate copolymer, 4-hydroxybutyl methacrylate copolymer, and 2-ethylhexyl acrylate·vinyl acetate·hydroxyethyl acrylate·glycidyl methacrylate copolymer. One of these may be used or two or more of these may be used in combination.

As the acrylic-based adhesive agent having no carboxy group, a commercially-available one may be used as appropriate, and it is possible to use as appropriate, for example, acrylic-based polymers comprised in MAS 811 and MAS 683 (manufactured by CosMED Pharmaceutical Co. Ltd.); 87-900A, 87-901A, 87-9301, 87-4098, 87-9088, and 87-9085 of Duro-Tak (registered trademark) acrylic adhesive agent series (manufactured by Henkel AG & Co. KGaA); GMS 3083, GMS 3253, and GMS 3235 of GELVA (registered trademark) acrylic adhesive agent series (manufactured by Henkel AG & Co. KGaA), and the like, and acrylic-based polymers comprised in 87-202A, 87-2287, 87-2516, 87-2510, 87-4287, 87-2525, 87-201A, 87-202A, 87-208A, 87-502A, 87-503A, and 87-504A of Duro-Tak (registered trademark) acrylic adhesive agent series (manufactured by Henkel AG & Co. KGaA); GMS 788 and GMS 737 of GELVA (registered trademark) acrylic adhesive agent series (manufactured by Henkel AG & Co. KGaA), and the like.

In the case where the adhesive agent layer according to the present invention comprises an acrylic-based adhesive agent, the content thereof (which is, in the case where there are two or more, the total content of these, the same applies hereinafter.) is preferably 10 to 90% by mass, more preferably 10 to 80% by mass, and further preferably 20 to 70% by mass, relative to the total mass of the adhesive agent layer. If the content of the acrylic-based adhesive agent is less than the lower limit, the cohesive force of the adhesive agent layer tends to decrease. On the other hand, if the content is more than the upper limit, the skin permeability of ropinirole tends to decrease.

The silicone-based adhesive agent according to the present invention includes silicone rubbers represented by MQ (polydimethylsiloxane), VMQ (polymethylvinylsiloxane), PMQ (polymethylphenylsiloxane), and PVMQ (polyphenylvinylmethylsiloxane) in ASTM standard (ASTM D 1418), a mixture of at least one of these and a silicone resin such as polyditrimethylsilylsiloxane other than silicone rubbers, and the like. One of these may be used or two or more of these may be used in combination. Note that in the case where a silicone resin other than the silicone rubbers is mixed, the content of the silicone resin is preferably 0.1 to 20% by mass relative to the total mass of the silicone-based adhesive agent.

In addition, as these silicone-based adhesive agents, commercially-available ones may be used as appropriate. For example, silicone-based adhesive agents provided by DuPont Toray Specialty Materials K.K. under the following model numbers: BIO-PSA-7-410X, BIO-PSA-7-420X, BIO-PSA-7-430X, BIO-PSA-7-440X, BIO-PSA-7-450X, BIO-PSA-7-460X (the Xs are each independently 1 or 2), BIO-PSA AC7-4201, BIO-PSA AC7-4301, BIO-PSA AC7-4302, MD7-4502, MD7-4602, 7-9700, MG7-9800, MG7-9850; BIO-PSA-7-4560 (hot melt silicone adhesive agent), and the like may be used as appropriate.

Moreover, the silicone-based adhesive agent according to the present invention may be, for example, in the case of having methyl groups, one obtained by dehydrogenating the methyl groups to remove hydrogen atoms to crosslink the methyl groups by blending a peroxide; in the case of having vinyl groups, one obtained by binding a crosslinking agent composed of a SiH group-containing siloxane compound to crosslink the vinyl groups; in the case of having hydroxyl groups (that is, in the case of having silanol groups), one obtained by crosslinking the silanol groups through dehydration condensation, or the like.

In the case where the adhesive agent layer according to the present invention comprises the silicone-based adhesive agent, the content thereof (which is, in the case where there are two or more, the total content of these, the same applies hereinafter.) is preferably 10 to 90% by mass, more preferably 10 to 80% by mass, and further preferably 20 to 70% by mass relative to the total mass of the adhesive agent layer. If the content of the silicone-based adhesive agent is less than the lower limit, the cohesive force of the adhesive agent layer tends to decrease. On the other hand, if the content is more than the upper limit, the skin permeability of ropinirole tends to decrease.

The adhesive agent layer according to the present invention may further comprise an additional drug other than ropinirole and a pharmaceutically acceptable salt thereof; an absorption enhancer (transdermal absorption enhancer); an excipient such as an adsorbent, a tackifier, a plasticizer, a solubilizer, a filler, a stabilizer, a preservative, or the like as long as the effect of the present invention is not hindered.

The other drug other than ropinirole and a pharmaceutically acceptable salt thereof includes, for example, non-steroidal anti-inflammatory drugs (diclofenac, indomethacin, ketoprofen, felbinac, loxoprofen, ibuprofen, flurbiprofen, tiaprofenic acid, acemetacin, sulindac, etodolac, tolmetin, piroxicam, meloxicam, ampiroxicam, naproxen, azapropazone, methyl salicylate, glycol salicylate, valdecoxib, celecoxib, rofecoxib, amfenac, and the like), anti-histamine drugs (diphenhydramine, chlorphenamine, mequitazin, homochlorcyclizine, and the like), anti-hypertensive drugs (diltiazem, nicardipine, nilvadipine, metoprolol, bisoprolol, trandolapril, and the like), anti-Parkinson drugs (pergolide, bromocriptine, selegiline, and the like), bronchodilators (tulobuterol, isoproterenol, salbutamol, and the like), anti-allergic drugs (ketotifen, loratadine, azelastine, terfenadine, cetirizine, acitazanolast, and the like), local anesthetics (lidocaine, dibucaine, and the like), anesthetic-based analgesics (morphine and the like), agents for urinary organs (oxybutynin, tamsulosin, and the like), neuropsychiatric drugs (promazine, chlorpromazine, and the like), steroid hormone drugs (estradiol, progesterone, norethisterone, cortisone, hydrocortisone, and the like), antidepressants (sertraline, fluoxetine, paroxetin, citalopram, and the like), anti-dementia drugs (donepezil, rivastigmine, galantamine, and the like), anti-psychotic drugs (risperidone, olanzapine, and the like), central nervous system stimulant drugs (methylphenidate and the like), osteoporosis treatment drugs (raloxifene, alendronate, and the like), breast cancer preventive drugs (tamoxifen and the like), anti-obesity drugs (mazindol, sibutramine, and the like), insomnia treatment drugs (melatonin and the like), and anti-rheumatic drugs (actarit and the like). One of these may be used alone or two or more of these may be used in combination.

The absorption enhancer includes, for example, isopropyl myristate, isopropyl palmitate, lauryl alcohol, hexyl laurate, myristyl alcohol, oleyl alcohol, isostearyl alcohol, octyldodecanol, benzyl alcohol, glycerine monooleate (GMO), propylene glycol monolaurate (PGML), polyoxyethylene sorbitan monooleate (Tween 80), polyoxyethylene sorbitan tristearate (Tween polyoxyethylene sorbitan monostearate (Tween 60), polyoxyethylene sorbitan monolaurate (Tween 20), lauric acid diethanolamide (LADA), and the like. One of these may be used alone or two or more of these may be used in combination.

The adsorbent includes inorganic and/or organic substances having moisture absorbency, and more specifically includes minerals such as talc, kaolin, and bentonite; fumed silica (Aerosil (registered trademark) and the like), silicon compounds such as hydrous silica; metal compounds such as zinc oxide and dried aluminum hydroxide gel; weak acids such as lactic acid and acetic acid; sugars such as dextrin; and high molecular polymers such as polyvinylpyrrolidone, aminoalkyl methacrylate copolymer, crospovidone, carboxy vinyl polymer, and butyl methacrylate-methyl methacrylate copolymer. One of these may be used alone or two or more of these may be used in combination.

The tackifier is blended mainly for the purpose of enhancing the adhesiveness of the adhesive agent. Such a tackifier includes, for example, rosin-based resins, terpene-based resins, petroleum-based resins (alicyclic saturated hydrocarbon resin and the like), phenolic resins, and xylene-based resins. One of these may be used alone or two or more of these may be used in combination. In the case where such a tackifier is further comprised in the adhesive agent layer, the content of the tackifier (which is, in the case where there are two or more, the total content of these) is more preferably 10 to 80% by mass, and further preferably 20 to 60% by mass, relative to the total mass of the adhesive agent layer from the viewpoint of improving the adhesive force of the adhesive agent layer and/or alleviating local irritation at the peeling-off.

The plasticizer is blended mainly for the purpose of adjusting the adhesiveness of the adhesive agent layer, the fluidity in the production of the adhesive agent layer, the transdermal absorption feature of the drug, and the like. Such a plasticizer includes, for example, silicone oil; petroleum-based oils such as paraffinic process oils (liquid paraffin and the like), naphthenic process oils, and aromatic process oils; squalane, squalene; vegetable-based oils such as olive oil, *camellia* oil, castor oil, tall oil, and peanut oil; dibasic esters such as dibutyl phthalate and dioctyl phthalate; liquid rubbers such as liquid polybutene and liquid isoprene rubber; diethylene glycol, polyethylene glycol, propylene glycol, dipropylene glycol, and the like. One of these may be used alone or two or more of these may be used in combination. Among these, the plasticizer is preferably at least one selected from the group consisting of silicone oil, liquid paraffin, and liquid polybutene. In the case where the plasticizer is further comprised in the adhesive agent layer, the content of the plasticizer (which is, in the case where there are two or more, the total content of these) is more preferably 5 to 60% by mass, and further preferably 7 to 40% by mass, relative to the total mass of the adhesive agent layer from the viewpoint that the adhesive force as the patch becomes more favorable.

The solubilizer is blended mainly for the purpose of facilitating the dissolution of the drug. Such a solubilizer includes, for example, organic acids such as acetic acid, aliphatic alcohols, and surfactants. One of these may be used alone or two or more of these may be used in combination. Among these, the solubilizer is preferably at least one selected from the group consisting of organic acids and aliphatic alcohols.

The filler is blended mainly for the purpose of adjusting the adhesive force of the adhesive agent layer. Such a filler includes, for example, aluminum hydroxide, calcium carbonate, magnesium carbonate; silicates such as aluminum silicate and magnesium silicate; silicic acid, barium sulfate, calcium sulfate, calcium zincate, zinc oxide, and titanium oxide. One of these may be used alone or two or more of these may be used in combination.

For the adhesive agent layer according to the present invention, a component that functions as a desalting agent for the pharmaceutically acceptable acid addition salt of ropinirole besides the sodium carboxylate according to the present invention may further be used as long as the effect of the present invention is not hindered. Such a component includes, for example, metal ion-containing desalting agents and basic nitrogen atom-containing desalting agents. The metal ion-containing desalting agents include strong bases such as sodium hydroxide and potassium hydroxide, and one of these may be used or two or more of these may be used in combination. In addition, weak bases such as magnesium hydroxide, sodium acetate (including sodium acetate anhydrous), sodium hydrogen carbonate, potassium hydrogen carbonate, sodium citrate, and sodium lactate are also components that can function as desalting agents. Since in the present invention, the patch is excellent in the skin permeability of ropinirole even without blending these components, it is preferable that such components are not substantially blended. More specifically, the amount of the above-listed component to be blended (which is, in the case where there are two or more, the total amount of these to be blended) is preferably 1% by mass or less, and more preferably 0.1% by mass or less, relative to the total mass of the adhesive agent layer.

The thickness of the adhesive agent layer according to the present invention is not particularly limited, but is preferably a thickness with which the mass per unit area of the adhesive agent layer becomes 25 to 250 $g/m^2$, more preferably a thickness with which the mass per unit area becomes 50 to 200 $g/m^2$, further preferably a thickness with which the mass per unit area becomes 50 to 150 $g/m^2$, and even more preferably a thickness with which the mass per unit area becomes 50 to 120 $g/m^2$, for example.

The patch of the present invention may be packaged (preferably sealed) in a package container for a period after the production to the time of use. The package container is not particularly limited, and a package container that can normally be used as a package container for patches may be used as appropriate. For example, it is preferable to use a plastic packaging bag, a plastic packaging bag in which a metal layer (for example, an aluminum layer) is formed, a metal packaging bag (for example, an aluminum packaging bag), and the like.

In addition, the packaged formulation in which the patch of the present invention is packaged in the package container may further have oxygen absorbing means. The oxygen absorbing means includes an oxygen absorber using an iron powder and an oxygen absorber containing vitamin C as a main component to be sealed in the package container (more specifically, AGELESS series (manufactured by Mitsubishi Gas Chemical Company, Inc.), PharmaKeep series (manufactured by Mitsubishi Gas Chemical Company, Inc.), and the like); and the package container including a layer having an oxygen absorbing function (more specifically, a layer in which a powder of aluminum, zinc, manganese, copper, iron, hydrosulfite, activated carbon, or the like is mixed, or the like).

The patch of the present invention may be produced, for example, by the following production method. First, the ropinirole and/or a pharmaceutically acceptable salt thereof, the sodium carboxylate, and the adhesive agent, as well as the additional drug, the absorption enhancer, the excipient, the solvent, and the like as necessary are mixed in accordance with a conventional method to obtain a uniform adhesive agent layer composition. The solvent includes, for example, water, anhydrous ethanol, toluene, hexane, ethyl acetate, cyclohexane, heptane, butyl acetate, ethanol, methanol, xylene, isopropanol, and a mixture liquid of two or more of these. Subsequently, this adhesive agent layer composition is spread onto a surface of the backing layer (normally one of the surfaces), and thereafter, the solvent is dried and removed as necessary to form an adhesive agent layer. The product is further cut into a desired shape as necessary to obtain the patch of the present invention.

In addition, the method for producing the patch of the present invention may further include a step of applying the release liner on a surface of the adhesive agent layer opposite to the backing layer. The production method may be such that after the adhesive agent layer composition is first spread to one surface of the release liner to form the adhesive agent layer, the backing layer is applied onto the surface of the adhesive agent layer opposite to the release liner, and the product is cut into a desired shape as necessary to obtain the patch of the present invention. Moreover, the patch thus obtained may be packaged (preferably sealed) in the package container to obtain a packaged formulation as necessary.

The method for improving skin permeability of ropinirole and/or a pharmaceutically acceptable salt thereof of the present invention is a method in a ropinirole-containing patch comprising a backing layer and an adhesive agent layer, wherein
the adhesive agent layer comprising:
at least one selected from the group consisting of ropinirole and a pharmaceutically acceptable salt thereof and an adhesive agent,
the method comprising:
a step of causing the adhesive agent layer to further comprise at least one sodium carboxylate selected from the group consisting of sodium pentanoate, disodium glutarate, and sodium hexanoate.

The backing layer, the adhesive agent layer, the ropinirole and a pharmaceutically acceptable salt thereof, the adhesive agent, and the sodium carboxylate are each as described above, including the preferable aspects.

The method for causing the adhesive agent layer to further comprise the sodium carboxylate according to the present invention includes, for example, a method including: mixing the ropinirole and/or a pharmaceutically acceptable salt thereof, the sodium carboxylate, and the adhesive agent, as well as the additional drug, the absorption enhancer, the excipient, and the solvent, and the like as necessary; and forming the adhesive agent layer composition thus obtained to obtain the adhesive agent layer, as described in the above method for producing the patch of the present invention. In this way, it is possible to improve the skin permeability of ropinirole and/or a pharmaceutically acceptable salt thereof in the obtained ropinirole-containing patch.

EXAMPLES

The present invention will be described more specifically below based on Examples and Comparative Examples; however, the present invention is not limited to Examples below. Note that the skin permeation test on patches obtained respectively in Examples and Comparative Examples were performed by a method described below.

<Skin Permeation Test (In Vitro Hairless Mouse Skin Permeation Test)>

First, the skin of the trunk of a hairless mouse was peeled off and the adipose was removed, and the patch which had been cut into the size of 3.14 $cm^2$ and from which the release liner had been removed was applied to the epidermis side thereof. This was set in a flow through-type Franz permeation test cell such that the dermis side came into contact with a receptor solution, and the cell was filled with the receptor solution (PBS). Subsequently, the receptor solution was sent at a flow rate of about 2.5 mL/hr while a warmed circulation water was caused to circulate on the outer periphery such that the receptor solution was kept at 32° C. Then, the receptor solution was sampled every 4 hours until 24 hours. The concentration of ropinirole (ropinirole concentration: concentration in terms of ropinirole hydrochloride) in the sampled receptor solution was measured by a high performance liquid chromatography, and the skin permeation amount of ropinirole per unit area of the adhesive agent layer was calculated in accordance with the following formula:

the skin permeation amount of ropinirole ($\mu g/cm^2$)={the concentration of ropinirole in the receptor solution ($\mu g/mL$)×the flow rate (mL)}/the patch area ($cm^2$) to obtain the skin permeation amount per hour (skin permeation rate ($\mu g/cm^2/hr$)). The maximum value of the skin permeation rate within 24 hours after the start of the application was obtained as a maximum skin permeation rate (Jmax, $\mu g/cm^2/hr$). In addition, the cumulative skin permeation amount for 24 hours after the start of the application was obtained as a 24 hr cumulative skin permeation amount ($\mu g/cm^2$).

Moreover, the availability (%) of the drug (ropinirole hydrochloride) blended in each patch was obtained from the mass ($\mu g$) of ropinirole hydrochloride blended in each patch and the 24 hr cumulative skin permeation amount ($\mu g/cm^2$) in accordance with the following formula:

the availability (%)={the 24 hr cumulative skin permeation amount($\mu g/cm^2$)×the patch area ($cm^2$)× 100}/the mass ($\mu g$) of ropinirole hydrochloride blended in the patch.

Example 1

First, 15.0 parts by mass of ropinirole hydrochloride, 6.3 parts by mass of sodium pentanoate (corresponding to 1.0 mol relative to 1.0 mol of ropinirole hydrochloride in number of moles), 13.12 parts by mass of styrene-isoprene-styrene block copolymer (SIS), 8.74 parts by mass of polyisobutylene (PIB), 39.35 parts by mass of alicyclic saturated hydrocarbon resin, and 17.49 parts by mass of liquid paraffin were added to an appropriate amount of a solvent (water, methanol, and toluene), followed by mixing to obtain an adhesive agent layer composition. Subsequently, the adhesive agent layer composition thus obtained was spread onto a release liner (a film made of polyester and processed by release treatment) to have a thickness of 100 g/m$^2$, and the solvent was dried and removed to form an adhesive agent layer. A backing layer (a film made of polyester) was laminated on a surface of the adhesive agent layer thus obtained opposite to the release liner to obtain a patch in which the backing layer/the adhesive agent layer/the release liner were laminated in this order.

Examples 2 to 3, Comparative Examples 1 to 5

Patches were obtained in the same manner as in Example 1 except that the composition of the adhesive agent layer composition became compositions shown in Tables 1 to 2 below.

The above-described skin permeation test was conducted on each of the patches obtained in Examples 1 to 3 and Comparative Examples 1 to 5. The results are shown in Tables 1 to 2 below together with the compositions (except for the solvent) of the respective adhesive agent layer compositions. Note that in Tables below, the numerical value in parentheses in the column of ropinirole hydrochloride indicates parts by mass in terms of free ropinirole.

TABLE 1

| Adhesive agent layer composition [parts by mass] | Example 1 | Example 2 | Example 3 |
|---|---|---|---|
| Ropinirole hydrochloride (in terms of free form) | 15.0 (13.2) | 15.0 (13.2) | 15.0 (13.2) |
| Sodium pentanoate | 6.3 | — | — |
| Disodium glutarate | — | 8.9 | — |
| Sodium hexanoate | — | — | 7.0 |
| SIS | 13.12 | 12.68 | 13.00 |
| PIB | 8.74 | 8.46 | 8.67 |
| Alicyclic saturated hydrocarbon resin | 39.35 | 38.05 | 39.00 |
| Liquid paraffin | 17.49 | 16.91 | 17.33 |
| Total | 100 | 100 | 100 |
| Maximum skin permeation rate [μg/cm$^2$/hr] | 13.9 | 12.9 | 28.3 |
| 24 hr cumulative skin permeation amount [μg/cm$^2$] | 206 | 246 | 461 |
| Availability [%] | 13.7 | 16.4 | 30.7 |

TABLE 2

| Adhesive agent layer composition [parts by mass] | Comparative Example 1 | Comparative Example 2 | Comparative Example 3 | Comparative Example 4 | Comparative Example 5 |
|---|---|---|---|---|---|
| Ropinirole hydrochloride (in terms of free form) | 15.0 (13.2) | 15.0 (13.2) | 15.0 (13.2) | 15.0 (13.2) | 15.0 (13.2) |
| Sodium benzoate | 7.3 | — | — | — | — |
| Potassium sorbate | — | 7.6 | — | — | — |
| Sodium adipate | — | — | 9.6 | — | — |
| Sodium gluconate | — | — | — | 11.0 | — |
| Sodium lactate | — | — | — | — | 5.7 |
| SIS | 12.9 | 12.9 | 12.57 | 12.33 | 13.2 |
| PIB | 8.6 | 8.6 | 8.38 | 8.22 | 8.8 |
| Alicyclic saturated hydrocarbon resin | 38.9 | 38.7 | 37.7 | 37.0 | 39.7 |
| Liquid paraffin | 17.3 | 17.2 | 16.75 | 16.45 | 17.6 |
| Total | 100 | 100 | 100 | 100 | 100 |
| Maximum skin permeation rate [μg/cm$^2$/hr] | 4.1 | 5.5 | 3.6 | 0.8 | 1.1 |
| 24 hr cumulative skin permeation amount [μg/cm$^2$] | 67.3 | 98.8 | 53.0 | 12.0 | 18.7 |
| Availability [%] | 4.5 | 6.6 | 3.5 | 0.8 | 1.2 |

As is clear from the results shown in Table 1, it was confirmed that the patches of the present invention obtained using sodium pentanoate, disodium glutarate, or sodium hexanoate (for example, Examples 1 to 3) were high in all of maximum skin permeation rate, 24 hr cumulative skin permeation amount, and availability, and particularly excellent in the skin permeability of ropinirole. On the other hand, as is clear from the results shown in Table 2, it was confirmed that in the cases of using a metal salt of an aromatic acid (for example, Comparative Example 1) and other alkali metal salts of carboxylic acids (for example, Comparative Examples 2 to 5) in place of these sodium carboxylates, the patches were low in all of maximum skin permeation rate, 24 hr cumulative skin permeation amount, and availability, and were inferior to the patches of the present invention in the skin permeability of ropinirole.

INDUSTRIAL APPLICABILITY

As described above, the present invention makes it possible to provide a ropinirole-containing patch that is excellent in skin permeability of ropinirole and/or a pharmaceutically acceptable salt thereof and a method for improving skin permeability of ropinirole and/or a pharmaceutically acceptable salt thereof.

The invention claimed is:

1. A ropinirole-containing patch comprising a backing layer and an adhesive agent layer, wherein
   the adhesive agent layer comprising:
   at least one selected from the group consisting of ropinirole and a pharmaceutically acceptable salt thereof;
   at least one sodium carboxylate selected from the group consisting of sodium pentanoate, disodium glutarate, and sodium hexanoate; and
   an adhesive agent.

2. The ropinirole-containing patch according to claim 1, wherein
   a content of the sodium carboxylate is 0.1 to 45% by mass relative to a total mass of the adhesive agent layer.

3. The ropinirole-containing patch according to claim 1, wherein
   a content of the sodium carboxylate in the adhesive agent layer is 0.1 to 5.0 mol relative to 1.0 mol of the at least one selected from the group consisting of ropinirole and a pharmaceutically acceptable salt thereof in content in terms of free ropinirole.

4. The ropinirole-containing patch according to claim 1, wherein
   a content of the at least one selected from the group consisting of ropinirole and a pharmaceutically acceptable salt thereof in terms of free ropinirole is 5 to 30% by mass relative to a total mass of the adhesive agent layer.

5. The ropinirole-containing patch according to claim 1, wherein
   the adhesive agent is at least one selected from the group consisting of a rubber-based adhesive agent, an acrylic-based adhesive agent having no carboxy group, and a silicone-based adhesive agent.

6. A method for improving skin permeability of at least one selected from the group consisting of ropinirole and a pharmaceutically acceptable salt thereof in a ropinirole-containing patch comprising a backing layer and an adhesive agent layer, wherein
   the adhesive agent layer comprising:
   at least one selected from the group consisting of ropinirole and a pharmaceutically acceptable salt thereof and an adhesive agent,
   the method comprising:
   a step of causing the adhesive agent layer to further comprise at least one sodium carboxylate selected from the group consisting of sodium pentanoate, disodium glutarate, and sodium hexanoate.

* * * * *